(12) United States Patent
Augesky et al.

(10) Patent No.: US 10,714,970 B2
(45) Date of Patent: Jul. 14, 2020

(54) POWER SUPPLY UNIT

(71) Applicant: Siemens Aktiengesellschaft, Munich (DE)

(72) Inventors: Christian Augesky, Vienna (AT); Harald Schweigert, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 1072 days.

(21) Appl. No.: 14/374,766

(22) PCT Filed: Jan. 15, 2013

(86) PCT No.: PCT/EP2013/050609
§ 371 (c)(1),
(2) Date: Jul. 25, 2014

(87) PCT Pub. No.: WO2013/117387
PCT Pub. Date: Aug. 15, 2013

(65) Prior Publication Data
US 2014/0346870 A1     Nov. 27, 2014

(30) Foreign Application Priority Data

Feb. 6, 2012   (EP) ..................................... 12153977

(51) Int. Cl.
| *H02J 9/06* | (2006.01) |
| *H02J 7/00* | (2006.01) |
| *H02M 3/04* | (2006.01) |
| *H02J 7/34* | (2006.01) |

(52) U.S. Cl.
CPC ................. *H02J 9/061* (2013.01); *H02J 7/00* (2013.01); *H02M 3/04* (2013.01); *H02J 7/345* (2013.01); *Y10T 307/344* (2015.04)

(58) Field of Classification Search
CPC ................................. H02J 9/061; H02M 3/04
See application file for complete search history.

(56) References Cited

U.S. PATENT DOCUMENTS

| 5,049,805 A |   | 9/1991 | Celenza |   |
|---|---|---|---|---|
| 5,915,122 A | * | 6/1999 | Tsurumi | ................... G06F 1/184 711/101 |
| 5,939,865 A | * | 8/1999 | McGrath | ............... H02J 7/0029 320/106 |

(Continued)

FOREIGN PATENT DOCUMENTS

| CN | 101534013 | 9/2009 |
| EP | 2395626 | 12/2011 |

OTHER PUBLICATIONS

Office Action dated Aug. 8, 2018 issued in India Patent Application No. 5422/DELNP/2014.

*Primary Examiner* — Daniel Kessie
(74) *Attorney, Agent, or Firm* — Cozen O'Connor

(57) ABSTRACT

A power supply unit having a circuit for uninterrupted power supply comprises a first DC-DC converter arranged on the input side, at least one output configured for outputting an output DC voltage, and at least one first output switching controller. A DC link is arranged between the first DC-DC converter and the at least one output switching controller for regulating the at least one output DC voltage on the output side. The first DC link is connected to an energy storage module.

16 Claims, 7 Drawing Sheets

(56) References Cited

U.S. PATENT DOCUMENTS

| | | | | |
|---|---|---|---|---|
| 7,131,014 B2* | 10/2006 | Suzuki | ................... | G06F 1/26 |
| | | | | 713/300 |
| 2002/0071292 A1* | 6/2002 | Aihara | ................. | H02J 9/061 |
| | | | | 363/20 |
| 2002/0186576 A1* | 12/2002 | Kanouda | ............... | H02J 9/061 |
| | | | | 363/125 |
| 2005/0269881 A1* | 12/2005 | Mercer | ................... | H02J 1/14 |
| | | | | 307/42 |
| 2006/0290207 A1 | 12/2006 | Himpe | | |
| 2007/0278968 A1* | 12/2007 | Takada | ............. | H05B 41/2886 |
| | | | | 315/247 |
| 2008/0054862 A1* | 3/2008 | Hara | ................... | H02M 3/157 |
| | | | | 323/234 |
| 2009/0129128 A1 | 5/2009 | Hirahara | | |
| 2010/0225346 A1* | 9/2010 | Fefer | ................... | G01R 31/002 |
| | | | | 324/762.02 |
| 2011/0133559 A1 | 6/2011 | Honma | | |

\* cited by examiner

POWER SUPPLY UNIT

CROSS-REFERENCE TO RELATED APPLICATIONS

This is U.S. national stage of PCT Application. No. PCT/EP2013/050609, filed on Jan. 15, 2013, which claims priority to European Patent Application No. EP 12153977.9, filed on Feb. 6, 2012, each of which is hereby incorporated in its entirety by reference.

FIELD OF INVENTION

The invention relates to a power supply unit comprising at least one output for outputting an output DC voltage and a circuit for uninterrupted power supply.

DESCRIPTION OF THE RELATED ART

Power supply units are used to convert a voltage from a supply network into a regulated output DC voltage for supplying at least one connected load. Many application areas require network failures to be bridged in this case. Control units in industrial installations must continue to receive electrical energy during short-term failures of a supply network, for example. Energy must be buffered for this purpose, and released as required to supply the load.

According to the prior art, circuits for uninterrupted power supply (UPS) are arranged at the outputs of power supply units. For example, a standard power supply unit providing an output DC voltage of e.g., 24 V is connected to a DC UPS. Capacitors (FIG. 1) or accumulators (FIG. 2) are used as energy stores in the DC UPS. The UPS takes the energy for charging the energy store from the standard power supply unit.

In the case of a capacitor-based solution, a current path from the standard power supply unit to the load is switched to a current path from the charged capacitor to the load in the event of a network failure. In this case, a step-down or step-up switching controller ensures that the consumed capacitor voltage is converted to the prescribed output DC voltage.

The use of an accumulator does not require a step-down switching controller because the largely constant accumulator voltage can be adapted to the output DC voltage. Only a charging circuit is required in order to charge the accumulator using a standard power supply unit. In the event of a network failure, the load is supplied by the accumulator via a further switch. However, both solutions are disadvantageous in terms of implementation costs because two controlled units are used, namely a standard power supply unit and a DC UPS.

SUMMARY OF THE INVENTION

An object of the present invention is to specify an improvement over the prior art for a power supply unit of the type cited in the introduction. This object is achieved by an arrangement and features of the claimed invention.

In this case, a DC link is arranged between a DC-DC converter on the input side and at least one output switching controller for regulating the output DC voltage on the output side. An energy storage module is connected directly to this DC link with a variable voltage.

There is consequently no need for an additional device comprising a charging circuit and/or charge monitoring and a device/apparatus for switching of the supply branches. The two-stage nature of a DC-DC converter and an output switching controller connected on the load side allows an energy store to be connected directly to the DC link. This is advantageously configured as an extra-low-voltage DC link having a voltage of up to 45 V, for example, thereby making it easier and safer for a user to operate. Moreover, use of an accumulator requires fewer cells. For example, a resonance converter having a fixed transformation ratio can be used as a DC-DC converter.

In one embodiment, a power supply unit comprises an output switching controller, and it is therefore easy to increase the network failure bridging time by attaching additional energy storage modules without further changes to the structure of the circuit. It is also possible to connect a plurality of output switching controllers to the DC link, such that the power supply has a plurality of possibly different output DC voltages.

In one embodiment, the output switching controller or output switching controllers are adapted as step-down switching controllers. A DC link voltage can therefore be set to extra-low-voltage, allowing components to be attached and detached without danger. A step-down switching controller achieves a standard output voltage in the region of 24 V from such an extra-low-voltage DC link. By virtue of the small difference between the input and output voltage levels of the step-down switching controller, a high level of efficiency can be achieved in this case.

In this case, provision is advantageously made for the energy storage module to be arranged in a separate housing and connectable to the DC link using plug-in contacts. The DC link has a plurality of contacts for connecting a plurality of energy storage modules. Alternatively, the network failure bridging time can easily be modified by exchanging energy storage modules of different capacities.

The arrangement according to the present invention has the further advantage that the energy storage module can also be used to cover power peaks in the case of particularly unsteady loads, e.g., when starting a DC motor. Especially, energy storage module does not have to be switched since it is permanently connected to the DC link.

In one embodiment, the DC-DC converter is connected to a supply voltage on the input side via an active Power Factor Correction (PFC) circuit. Such an arrangement is provided for single-phase supply networks and reduces the adverse effect of harmonic waves on the network. It also allows a wider input voltage range.

In the simplest case, the energy storage module comprises a capacitor, e.g., an aluminum electrolytic capacitor or UltraCap. The capacitor is connected directly to the DC link in this case.

In order to restrict a charging current to the capacitor during activation of the power supply unit, the capacitor is advantageously connected to the DC link via a charging resistor. This means that the charging time of the capacitor does not adversely affect the rat up time of the power supply unit. The output DC voltage is already available before the capacitor is fully charged.

In one embodiment, a switch element is connected in parallel with the charging resistor. The charging resistor can, therefore, be bypassed as soon as the capacitor is charged. The switch element is connected to a control unit of the power supply unit for this purpose.

In one embodiment, the energy storage module comprises an accumulator, whereby longer network failure bridging times can be realized. If the DC link voltage at the output of the DC-DC converter is higher than the final charging voltage of the accumulator, a simple switch, such as a diode, suffices to return the energy to the DC link. No other additional electronics are required.

In some embodiments, provision is advantageously made for the accumulator to be connected to the DC link via a charging circuit. In the simplest case, such a charging circuit includes a resistor with a two-circuit switch in the accumulator module and a decoupling diode.

In another embodiment, provision is made for the power supply unit to comprise at least two output switching controllers on the output side, and also for the accumulator to be connected to the DC link via an output switching controller which is adapted as a charging circuit. The output switching controller already has a controllable voltage and current limiting device/apparatus in this case.

In the event of a network failure, the accumulator returns energy into the DC link via the switching controller. The switching controller then functions in the opposite direction as a step-up switching controller and raises the accumulator voltage level to a higher DC link voltage level. The ability to regulate the output DC voltage(s) remains completely unaffected. The number of accumulator cells is, therefore, also independent of the output DC voltages of individual load outputs.

Alternatively, the accumulator is additionally connected to the DC link via a decoupling element. The output switching controller need not be configured to return the accumulator current in this case. The output switching controller merely has to control the considerably lower charging current of the accumulator.

In some embodiments, the charging circuit or the energy storage module is connected to a control unit of the power supply unit via an additional connection in order to determine the charge status of the accumulator.

It is generally advantageous if the lower limit of the operating voltage of the output switching controller is lower than a discharge voltage of the energy storage module. A final discharge voltage of accumulators is often significantly lower than a no-load voltage. Even this low final discharge voltage can then be used by the output switching controller as an operating voltage on the input side.

In some embodiments, an additional DC link is provided in parallel with the DC link, and is supplied via an additional DC-DC converter. Output switching controllers are connected to this additional DC link. In this case, each DC link is advantageously connected to its own energy storage module. This results in a simple structure with distribution of the total power over two DC links.

Alternatively, provision is made for connecting a shared energy storage module to both DC links via a respective switch unit. The respective switch unit, in one embodiment, advantageously comprises a diode as a decoupling element.

In one embodiment, a protection device is advantageously provided in series with at least one switch unit. This protection device is configured such that if it is triggered, the additional DC link can still be supplied. The protected DC link can, therefore, be disconnected from the energy storage module in the event of a fault, without adversely affecting the operation of the further DC link. Buffering of the further DC link can still be provided by the energy storage module.

In one embodiment, a method for operating, a power supply unit comprises charging the energy storage module with energy from the DC link during normal operation and discharging the energy into the DC link as required. If applicable, an energy storage module may be charged by other means before it is connected to a DC link or during activation of the power supply unit.

BRIEF DESCRIPTION OF THE DRAWINGS

The invention is explained by way of example below with reference to the schematic illustrations in the appended figures, in which.

DETAILED DESCRIPTION OF THE PRESENTLY PREFERRED EMBODIMENTS

Figure 1:
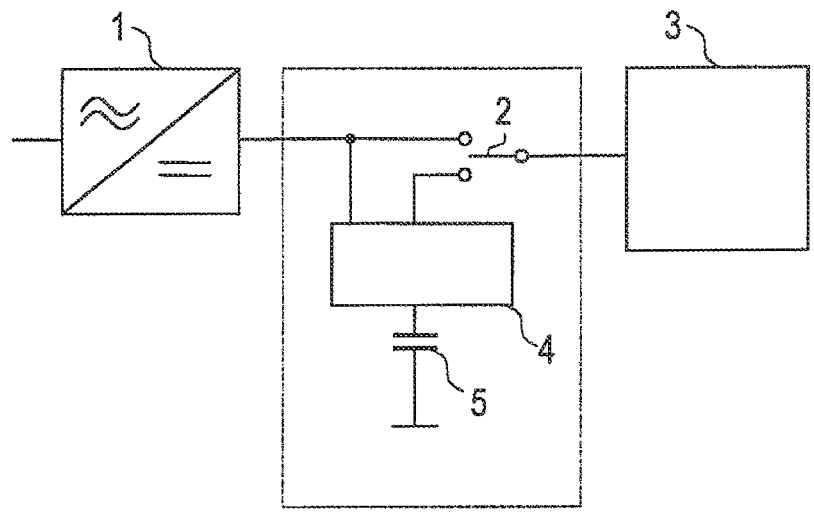
FIG. 1 shows a UPS with capacitor as per the prior art.

A first solution known in the art provides a UPS using a capacitor 5 (FIG. 1). During normal operation, a load 3 is connected to a power supply unit 1 via a switch 2. The power supply unit 1 is connected to a single-phase or three-phase supply network and delivers an output DC voltage at its output. The capacitor 5 is connected to this output DC voltage via a two-way buck/boost converter 4. The buck/boost converter 4 has an output which can be connected to the load 3 via the switch 2 in this case.

If the supply network fails, the switch 2 switches the current path from the power supply unit 1 to the output of the buck/boost converter 4. The energy stored in the capacitor 5 is released to the load 3 by the buck/boost converter 4 until either the supply network delivers energy again or the voltage in the capacitor 5 falls below the minimal input voltage of the buck/boost converter 4. In the latter case, the bridging capacity of the capacitor 5 is not sufficient.

Figure 2:
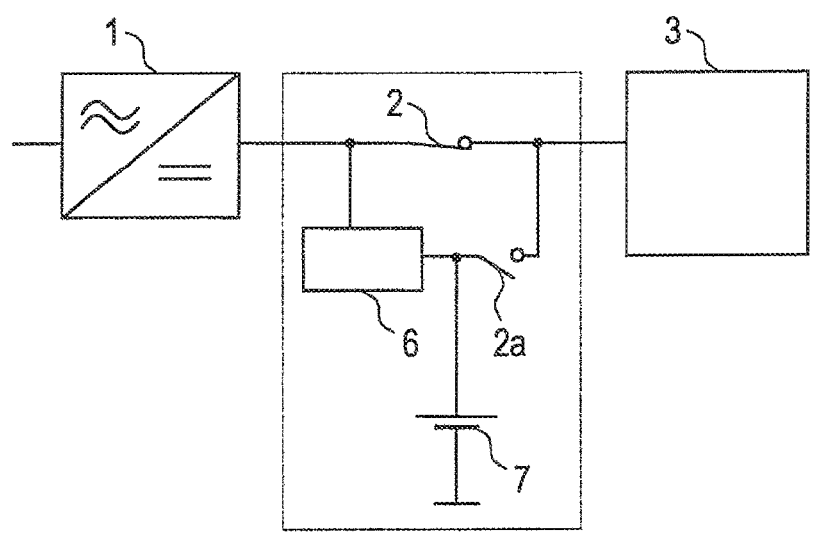
FIG. 2 shows a UPS with accumulator as per the prior art.

In order to extend the network failure bridging time, accumulators are used as per the prior art. A corresponding known circuit is shown in FIG. 2. A load 3 is again connected to a power supply unit 1 via a switch 2. Also connected to the power supply unit 1 is a charging circuit 6 for an accumulator 7. The load is also connected to the accumulator 7 via a further switch 2a as a decoupling element. If the network supply fails, the load 3 obtains its energy directly from the accumulator 7 via the further switch 2a.

In addition to a standard power supply, both known solutions require a separate UPS device having a dedicated circuit and control unit.

Figure 3:
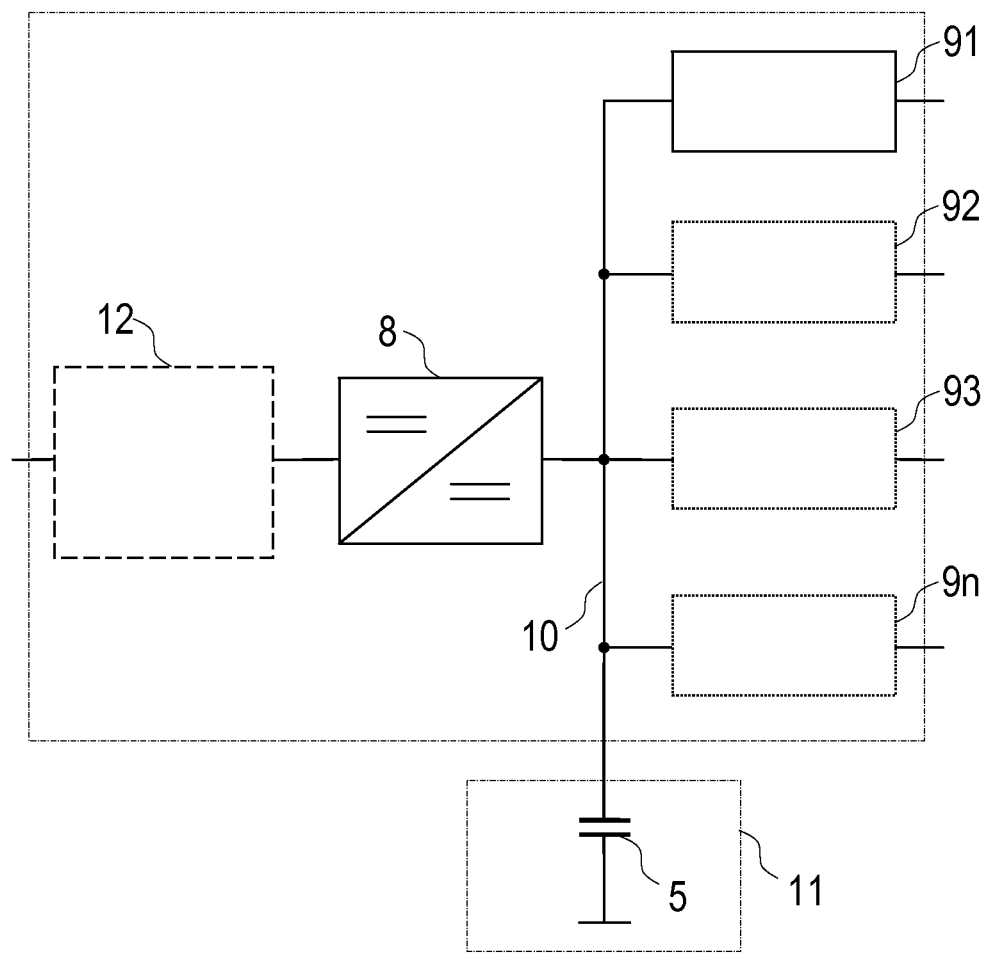
FIG. 3 shows a circuit arrangement with capacitor in accordance with one embodiment of the present invention.

An arrangement according to the present invention is illustrated in FIG. 3. In this case, a power supply unit is adapted as a switched-mode power supply comprising a DC-DC converter 8 and at least one output switching controller 91 which is connected on the load side. In the present example, four output switching controllers 91, 92, 93, 9n are connected to the output of the DC-DC converter 8. The connection between DC-DC converter 8 and the output switching controllers 91, 92, 93, 9n forms the DC link 10, at which a variable voltage is present.

The DC-DC converter 8 is adapted as a resonance converter with a fixed transformation ratio, for example. If a single-phase AC voltage network is used as a supply network, provision is advantageously made for connecting an active PFC circuit 12 on the line side of the DC-DC converter 8, in order to minimize harmonic waves in the supply network. In particular, such a power supply unit is suitable for supplying multiple loads with identical or different output DC voltages.

Each individual output switching controller 91, 92, 93, 9n converts the variable DC link voltage into a respective output DC voltage and regulates this to the prescribed value in each case. The DC link 10 is advantageously implemented as an extra-low-voltage DC link having a voltage between, e.g., 30 V and 60 V. The output DC voltages are lower than this voltage level (e.g., 24 V) when step-down switching controllers are used.

A capacitor 5 is connected directly to the DC link 10 as an energy storage module 11. In this case, the energy storage module 11 is arranged in a separate housing, for example, and can be connected to the DC link 10 via connection contacts.

Figure 4:
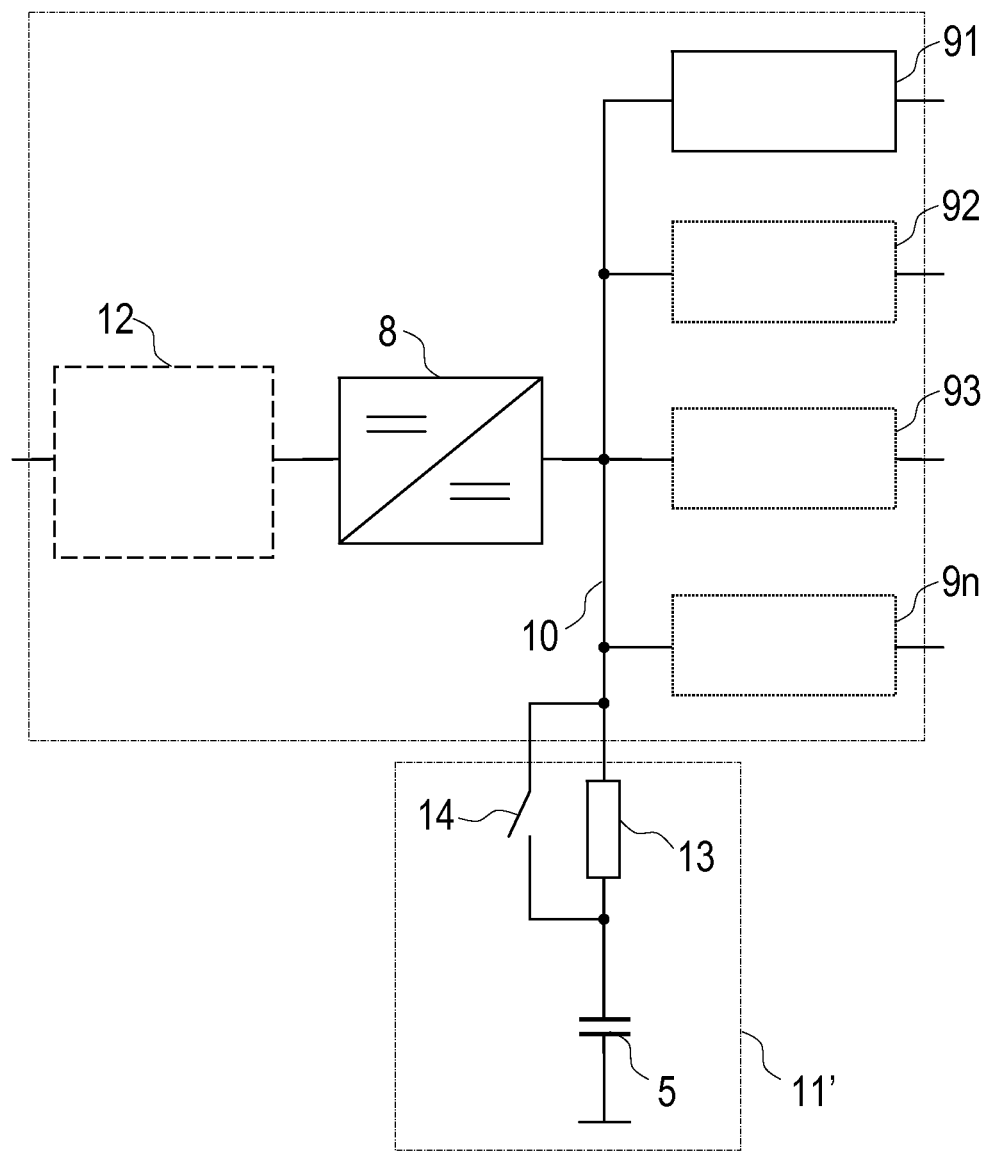
FIG. 4 shows a circuit arrangement with capacitor and charging circuit in accordance with one embodiment of the present invention.

In order to allow controlled charging of the energy storage module 11, a charging resistor 13 with a parallel connected switch 14 is provided between the capacitor 5 and the DC link 10 as shown in FIG. 4. This circuit arrangement prevents the entirety of the energy at the output of the DC-DC converter 8 from being used to charge the capacitor 5 during activation of the power supply unit. Instead, the DC link voltage remains high enough for the output switching controllers 91, 92, 93, 9n to supply a respective output DC voltage while the capacitor is charging.

The resistor 13 and the switch 14 are either combined with the capacitor 5 in a modified energy storage module 11' or integrated in a modified DC link circuit.

Figure 5:
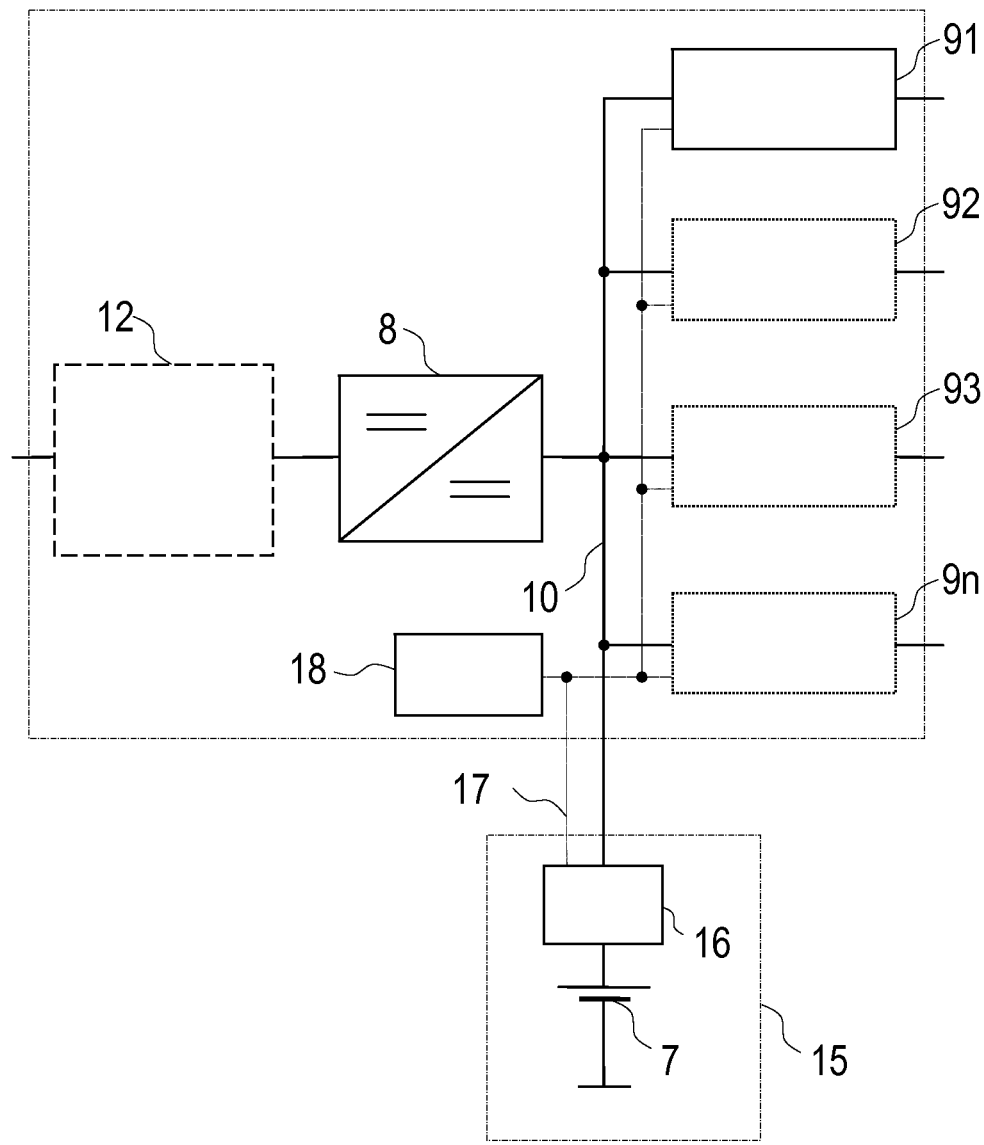
FIG. 5 shows a circuit arrangement with accumulator and charging circuit in accordance with one embodiment of the present invention.

A simple accumulator solution is illustrated in FIG. 5. The DC link 10 is connected to an accumulator 7 via a charging circuit 16. In addition to a charge regulator, the charging circuit 16 also comprises an output switching controller or at least one decoupling element for releasing the accumulator energy to the DC link 10 in this case. Accumulator 7 and charging circuit 16 are combined to form an energy storage module 15 in a shared housing and connected to the DC link 10 via connection contacts. Alternatively, the charging circuit 16 can be arranged in a DC link circuit.

A charge signal of the charging circuit is supplied to a control unit 18 of the power supply unit via a separate connection 17. The control unit 18 is implemented as a microcontroller, for example, and has a serial interface for this purpose. In this way, the charge status of the accumulator 7 can be displayed at the power supply device, or information can be forwarded to an external system control unit using a suitable device interface.

Figure 6:
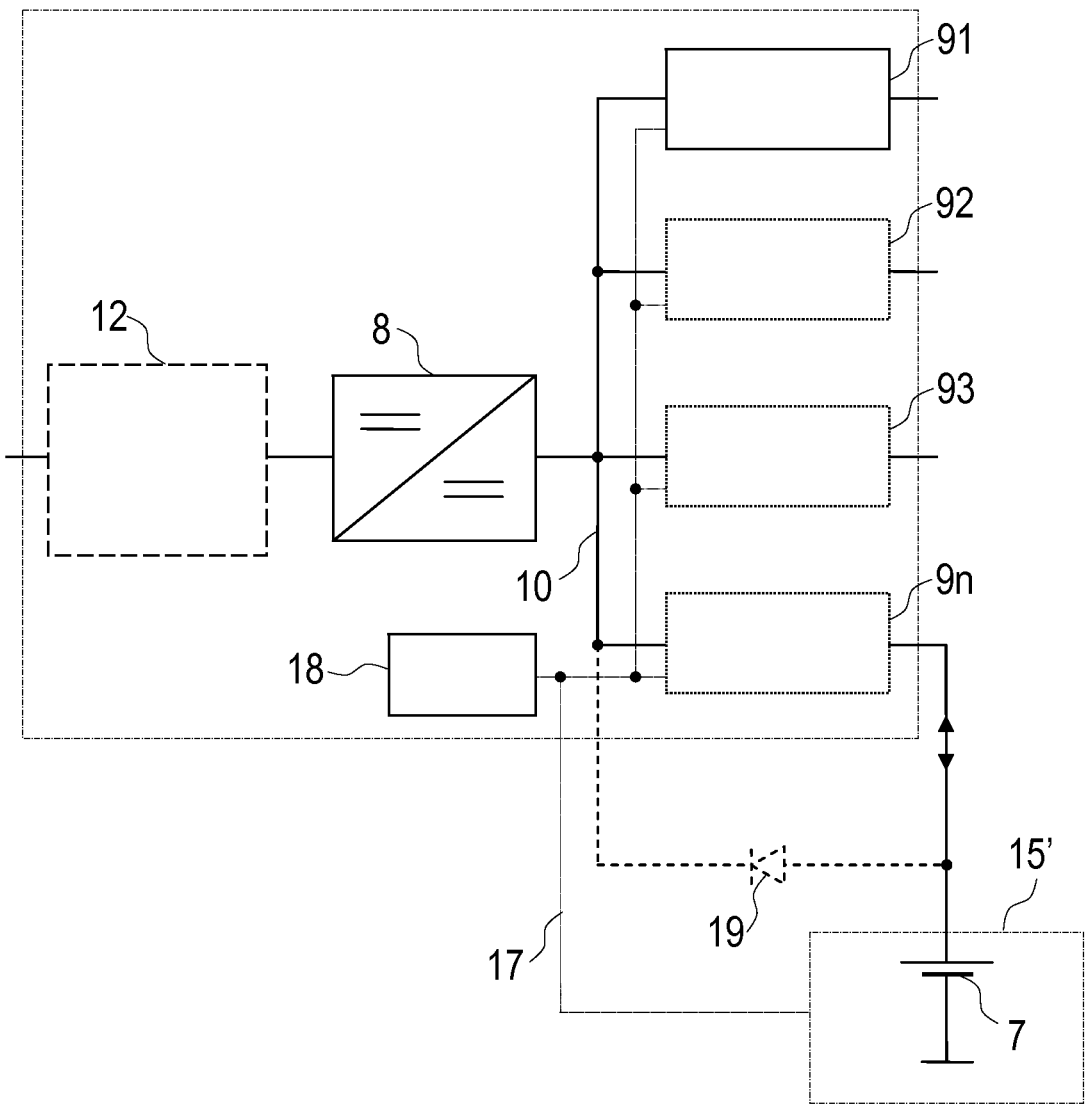
FIG. 6 shows a circuit arrangement with accumulator and a switching controller used as a charging circuit in accordance with one embodiment of the present invention.

If the power supply unit comprises a plurality of output switching controllers 91, 92, 93, 9n, one of these switching controllers 9n is advantageously used as a charging circuit of the accumulator 7, as illustrated in FIG. 6. The energy storage module 15' is connected directly to the output of the switching controller 9n in this case. A connection 17 to the control unit 18 is also provided for the purpose of signaling the charge status.

If the switching controller 9n is only used as a charge regulator of the accumulator 7, the accumulator 7 is additionally connected to the DC link 10 via a decoupling element 19. A decoupling element 19 can take the form of a diode, a transistor or a relay contact, for example. In this case, the dimensioning can be selected such that charging of the accumulator 7 can only take place within a specific input voltage range (e.g. 360 VAC to 550 VAC). No charging takes place if the supply network voltage is outside this range (e.g. 320 VAC to 359 VAC). This allows a favorable transformation ratio of the DC-DC converter 8 to be achieved. It also ensures that the DC-DC converter 8 is not subjected to a charging current if the current, which is already raised due to a high power output and associated supply voltage dip, would result in adverse thermal loading of the DC-DC converter 8.

Figure 7:
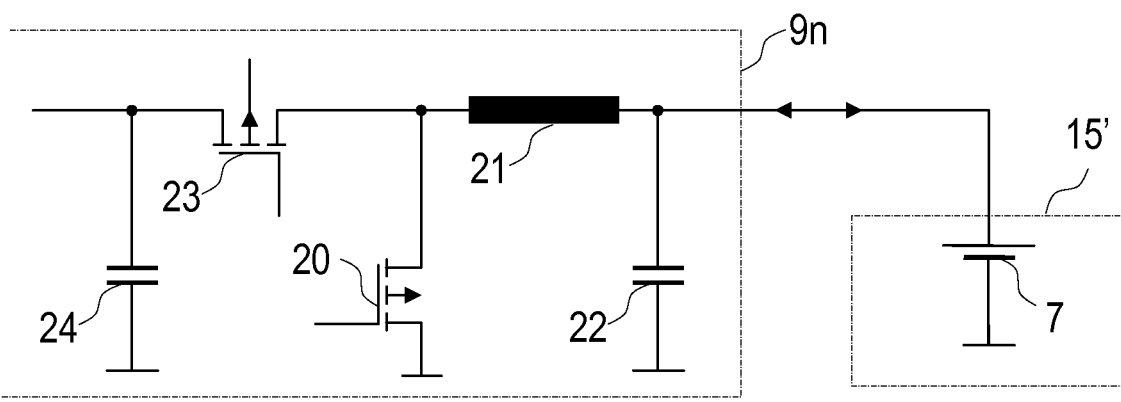
FIG. 7 shows a switching controller as per FIG. 6 with two-way operation in accordance with one embodiment of the present invention.

As an alternative to the return feed via a decoupling element 19, the switching controller 9n providing the charging circuit can be designed for two-way operation. In this case, instead of a freewheeling diode on the ground side, provision is made for a first switch 20 as illustrated in FIG. 7. The switching controller 9n has a choke 21. The first connection interface of the choke 21 is connected to the accumulator 7 and to ground via a capacitor 22. The second connection interface of the choke 21 is connected to ground via the first switch 20 and to the DC link 10 via a second switch 23, the connection of the second switch 23 to the DC link 10 being connected to ground via a further capacitor 24.

This circuit arrangement of a two-way buck/boost switching controller 9n functions in this case as a charging circuit for the accumulator 7 and as an energy recovery converter in buffering mode during a network failure. It is so configured to accommodate the total current flowing back into the DC link 10 in buffering mode. It is also possible in buffering mode to reduce the power output of the power supply unit in this case, in order to extend the bridging time during prolonged emergency operation and to reduce the load on the switching controller 9n.

Figure 8:
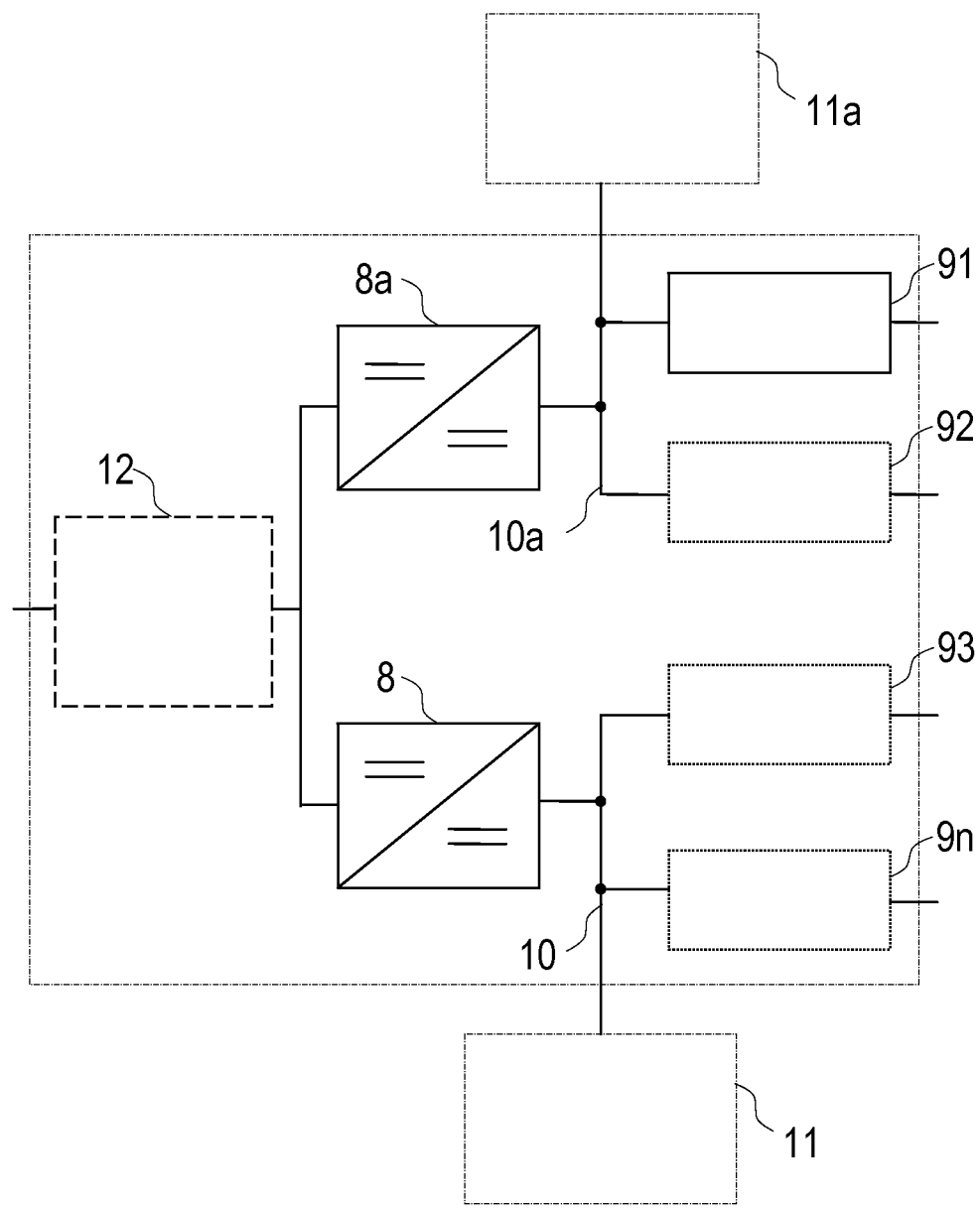
FIG. 8 shows a power supply unit with two paths and two energy storage modules in accordance with one embodiment of the present invention.

A power supply unit comprising two paths is illustrated in FIG. 8. Each path has its own DC-DC converter 8 and 8a and its own DC link 10 and 10a, respectively. Connected to each DC link 10, 10a, respectively, are output switching controllers 91, 92 and 93, 9n and an energy storage module 11 in each case. Each energy storage module 11 simply includes a capacitor as a storage element here. However, all other types of energy storage module 11', 15, 15' are possible.

Figure 9:
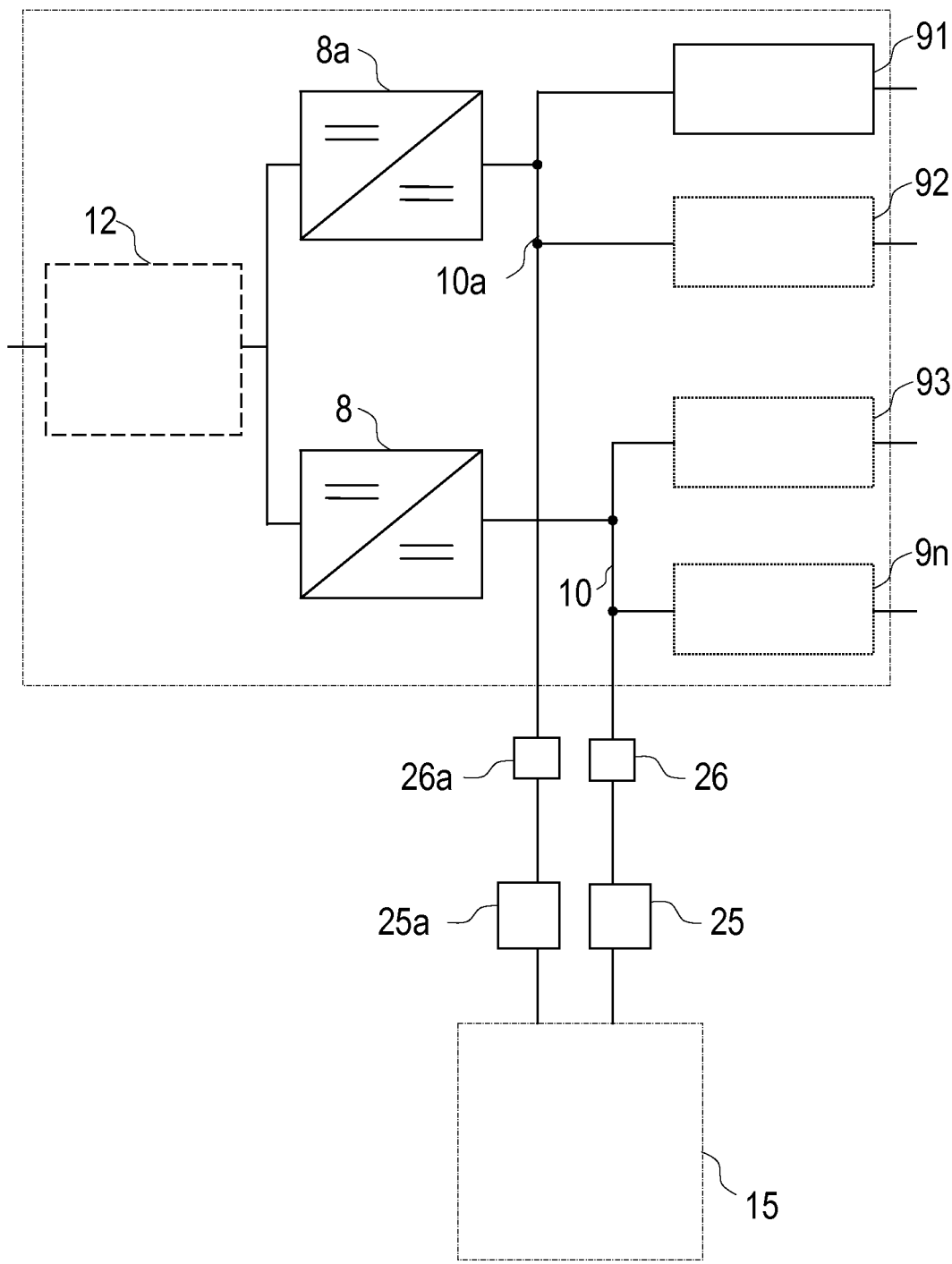
FIG. 9 shows a power supply unit with two paths and one energy storage module in accordance with one embodiment of the present invention.

FIG. 9 likewise shows a power supply unit comprising two paths. Both DC links 10, 10a have a shared ground, whereby a shared energy storage module 15 can be connected via respective switch units 25, 25a. For example, said shared energy storage module 15 comprises an accumulator and a charging circuit which receives energy from one of the two DC links 10, 10a. All other types of energy storage module 11, 11', 15' can also be connected to both DC links 10, 10a via correspondingly activated switch units 25, 25a.

In one embodiment, a protection device 26, 26a is arranged in series with each switch unit 25, 25a. This isolates a faulty path from the energy storage module 15 in the event of a failure, whereby buffering of the second path can continue. In this case, the protection device 26, 26a is configured to only trigger after an internal protection device (not shown) of the faulty path.

The explanations relating to the variants comprising two paths apply analogously to power supply units comprising more than two paths.

The present invention provides a device solution of simple construction for a power supply unit with flexibly variable energy storage modules. Depending on the application scenario, a different energy storage module 11, 11', 15, 15' or supplementary energy storage module 11, 11', 15, 15' can be connected to the DC link 10 at no additional structural cost. Each energy storage module 11, 11', 15, 15' is composed of a capacitor unit or accumulator unit without a costly UPS circuit.

Although the present invention has been described above with reference to presently preferred embodiments, it is not limited thereto but rather can be modified in a wide variety of ways. In particular, the invention can be altered or modified in multifarious ways without departing from the essence of the invention.

The invention claimed is:

1. A power supply unit having a circuit for uninterrupted power supply, comprising:
    a DC-DC converter connected to an input side of the power supply unit;
    at least one output via which a DC voltage is output;
    at least one first output switching controller operatively coupled to an output of the DC-DC converter, said at least one first output switching controller regulating the output DC voltage;
    a DC link having a variable voltage level and operatively coupled between the DC-DC converter and the at least one first output switching controller; and
    an energy storage module operatively coupled directly to the DC link, said energy storage module comprising an accumulator which is connected to the DC link via a charging unit;
    wherein the at least one output switching controller has a lower operating voltage limit, which is lower than a discharge voltage of the energy storage module.

2. The power supply unit of claim 1, wherein the at least one output switching controller is configured as a step-down switching controller.

3. The power supply unit of claim 1, wherein the energy storage module is arranged in a separate housing and is connectable to the DC link via plug-in contacts.

4. The power supply unit of claim 1, wherein the DC-DC converter is connected to a supply voltage on the input side of the power supply unit via a power factor correction (PFC) circuit.

5. The power supply unit of claim 1, wherein the energy storage module comprises a capacitor.

6. The power supply unit of claim 5, wherein the capacitor is connected to the DC link via a charging resistor.

7. The power supply unit of claim 6, further comprising:
    a switch element arranged in parallel with the charging resistor.

8. The power supply unit of claim 1, further comprising:
    at least two second output switching controllers connected on the output side;
    wherein the accumulator is connected to the DC link via one of the at least two second output switching controllers that is adapted as a charging circuit.

9. The power supply unit of claim 8, wherein the accumulator is additionally connected to the DC link via a decoupling element.

10. The power supply unit of claim 1, wherein one of the charging circuit and the energy storage module is connected to a control unit of the power supply unit via an additional connection to determine a charge status of the accumulator.

11. The power supply unit of claim 1, wherein a further DC link is provided in parallel with the DC link and is supplied via a further DC-DC converter.

12. The power supply unit of claim 11, wherein the DC link and the further DC links are each connected to a respective energy storage module.

13. The power supply unit of claim 11, wherein a shared energy storage module is connected to the DC link and the further DC link via a respective switch unit.

14. The power supply unit as claimed in claim 13, wherein the respective switch unit comprises a diode.

15. The power supply unit as claimed in claim 13, wherein a protection device is provided in series with at least one switch unit.

16. A method for operating a power supply unit of claim 1, comprising:
    charging the energy storage module with energy via the DC link; and
    discharging the energy into the DC link as required.

* * * * *